Jan. 31, 1967 E. G. McCOY 3,302,196
EMERGENCY ALARM CIRCUIT FOR USE WITH AIRCRAFT
DETECTION AND RECOGNITION SYSTEMS
Filed Aug. 2, 1957 2 Sheets-Sheet 1
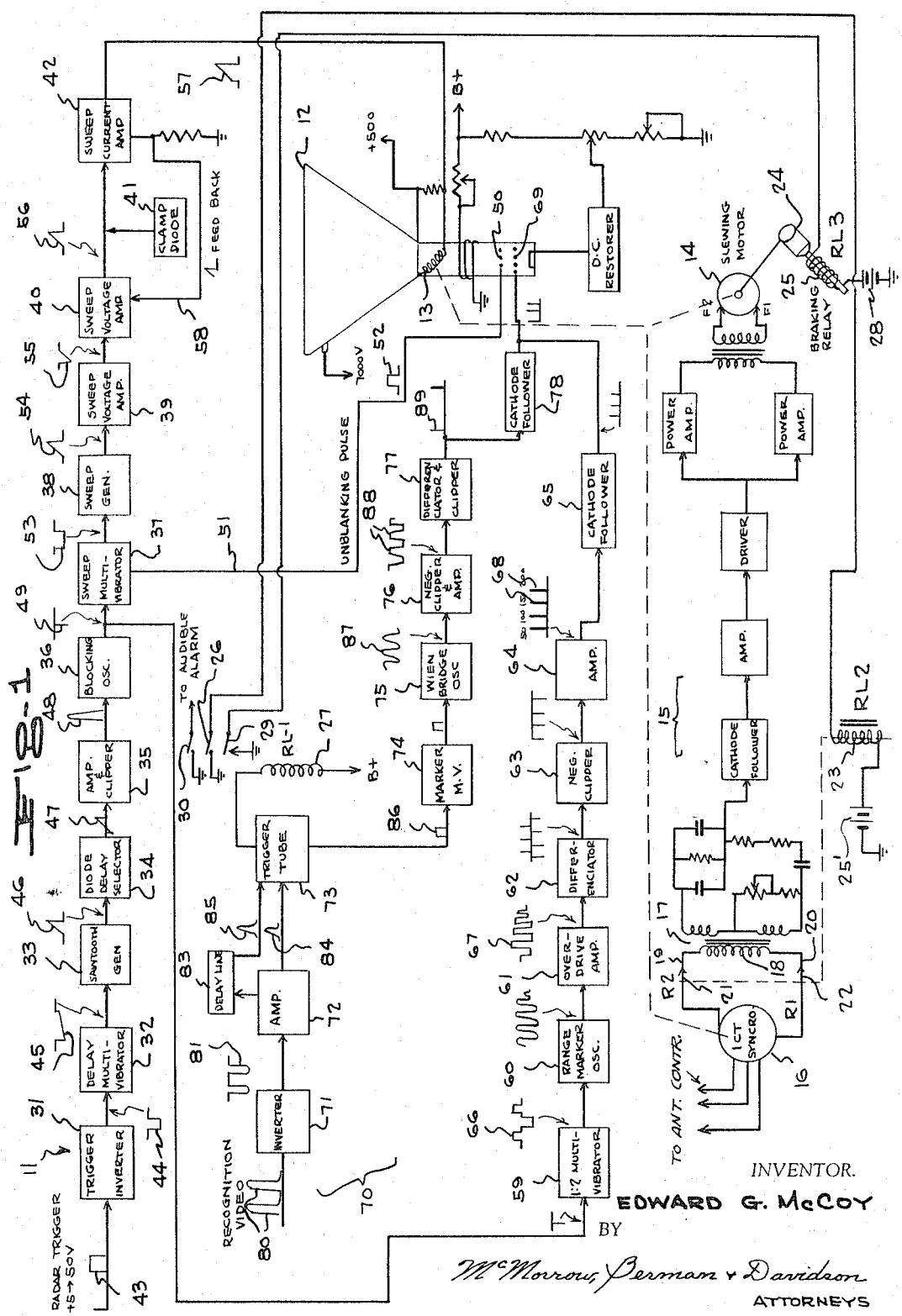
INVENTOR.
EDWARD G. McCOY
BY
McMorrow, Berman & Davidson
ATTORNEYS

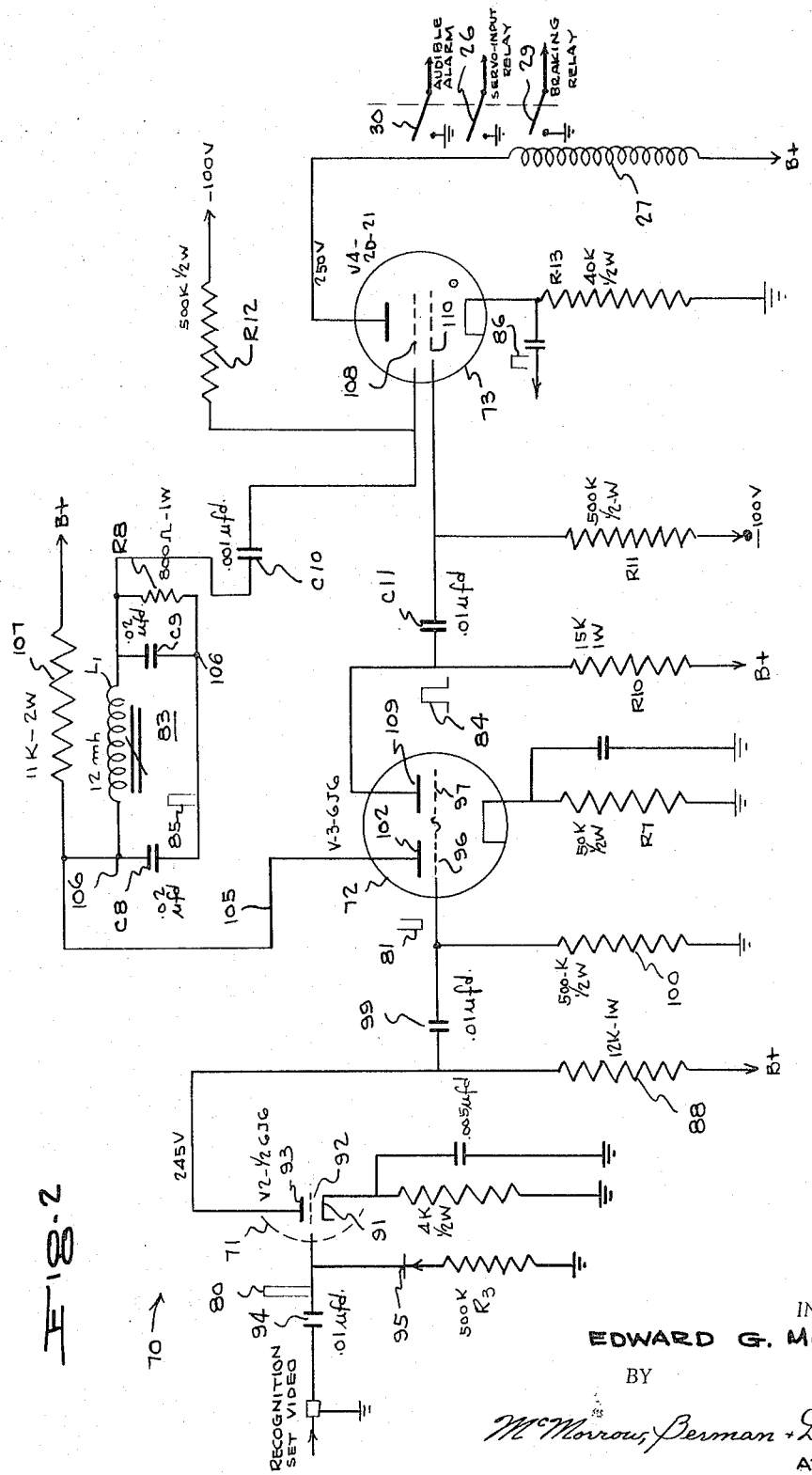

United States Patent Office 3,302,196
Patented Jan. 31, 1967

3,302,196
EMERGENCY ALARM CIRCUIT FOR USE WITH AIRCRAFT DETECTION AND RECOGNITION SYSTEMS
Edward G. McCoy, Mogadore, Ohio
(Belden Hill Estates, Rte. 7, Harpursville, N.Y. 13787)
Filed Aug. 2, 1957, Ser. No. 676,040
3 Claims. (Cl. 343—6.5)

This invention relates to aircraft detection and recognition systems and more particularly to an alarm circuit for use with interrogation systems for providing an alarm and also showing the range and bearing of an aircraft in distress.

A main object of the invention is to provide a novel and improved alarm circuit adapted for use with existing radar and recognition systems to provide an alarm and also show the range and bearing of an aircraft in distress while subject to an emergency condition.

A further object of the invention is to provide an improved alarm circuit adapted to cooperate with existing radar and recognition circuits and adapted to be triggered by an emergency signal from an aircraft in distress or subject to an emergency condition, the alarm circuit being arranged to provide an audible warning signal at the receiving station, to halt rotation of the normally rotating elements at the station, and to provide a visual representation on the screen of the radar oscilloscope at that station which indicates the range of the aircraft sending the emergency alarm signal.

A still further object of the invention is to provide an improved alarm circuit arranged to cooperate with existing radar and recognition circuits, the alarm circuit of the present invention being simple in construction, involving relatively few parts, and operating automatically without requiring the presence of a radar operator.

Further objects and advantages of the invention will become apparent from the following description and claims, and from the accompanying drawings, wherein:

FIGURE 1 is a block diagram of a radar and recognition system in which an improved emergency alarm system of the present invention is employed.

FIGURE 2 is a schematic wiring diagram showing the electrical connections of an emergency alarm circuit such as that employed in the system shown in FIGURE 1.

Referring to the drawings, 11 generally designates the radar trigger circuit of a conventional radar system. The radar system comprises an oscilloscope 12 having rotating deflection coils 13 mechanically coupled to a slewing motor 14 driven in a conventional manner by a motor energizing circuit 15, the motor 14 being also mechanically coupled to a servo device 16 which is coupled with the drive means for the radar antenna associated with the system. The energizing circuit for the slewing motor 14 includes an input transformer 17 having the pirmary winding 18 and the input leads 19 and 20. Connected in said input leads are respective relay armatures 21 and 22 controlled by a relay 23 whose winding is normally deenergized, and which when energized opens the primary circuit of transformer 17 by moving the armatures 21 and 22 to open circuit positions.

Except for the relay 23 and the components associated therewith, the circuitry associated with the slewing motor 14 is entirely conventional.

Associated with the slewing motor 14 is a conventional brake device 24 which is operated by a braking relay 25, the brake device 24 being effective to halt rotation of the shaft of the slewing motor 14 responsive to the energization of the braking relay 25.

As shown, the rotary deflection coils 13 are mechanically coupled to the shaft of the slewing motor as is the shaft of the device 16, so that when the slewing motor is halted, the rotary deflection coils 13 and the servo device 16 are likewise halted.

Relay 23 has its winding connected in circuit with a battery (or other suitable source of current), designated at 25', the circuit of the relay 23 also including the armature 26 of a relay 27, said relay 27 being normally deenergized and the armature 26 thereof being normally in open position. As will be readily apparent from FIGURE 1, when the relay 27 becomes energized, the armature 26 moves to closed position, energizing the relay 23.

The braking relay 25 is connected in a similar circuit, comprising a current supply source, such as a battery 28, the winding of relay 25 and battery 28 being connected in a circuit including another armature 29 of relay 27. The armature 29 is normally in open position and closes responsive to the energization of relay 27, thus causing the braking relay 25 to become energized.

The relay 27 also includes a third armature 30 which is connected in circuit with a suitable current source and audible alarm device, not shown, whereby the alarm device becomes energized responsive to the energization of the relay 27.

As will be readily apparent from the above explanation, the energization of relay 27 moves the respective armatures 29, 26 and 30 to closed positions, simultaneously energizing the audible alarm device, energizing the relay 23 and energizing the braking relay 25. This halts the slewing motor 14 as well as the rotary deflection coils 13 and the servo device 16, and at the same time opens the input circuit to the slewing motor 14 at the armatures 21 and 22. As is well understood by those skilled in the art, the halting of the slewing motor 14 and the deflection coils 13 can be utilized by the use of well known indicating means to provide a bearing reading corresponding to the angular position at which the slewing motor, deflection coils, and servo device 16 are halted.

The radar trigger circuit 11 is of well known construction and comprises a trigger inverter stage 31, a delay multi-vibrator 32, a sawtooth generator 33, a delay selecting diode stage 34, an amplifying and clipper stage 35, a blocking oscillator 36, a sweep multi-vibrator 37, a sweep generator 38, a sweep voltage amplifying stage 39, a second sweep voltage amplifying stage 40, a diode clamping stage 41, and a sweep current amplifying stage 42 which provides sweep current in the deflection coils 13. The operation of the radar trigger circuit is well known and briefly is as follows: A radar trigger pulse, shown at 43, which may be a positive pulse of from five to fifty volts, is inverted in the trigger inverter stage 31, as shown at 44. The inverted pulse is set to the delay multi-vibrator 32, and a negative block of voltage, shown at 45, is supplied to the sawtooth generator 33. The negative pulse 45 is employed to cut off a discharge tube which allows a condenser to charge in a linear manner toward a positive value. This provides a sawtooth wave 46 at the output of the generator 33 which may be of a magnitude representing a linear delay corresponding to a predetermined range distance, such as a linear delay of between zero and fifty miles. The sawtooth pulses 46 are applied to the plate of a delay selecting diode 34, the cathode potential of said diode being variable by any suitable conventional means. Thus the delay selector stage 34 may be adjusted so that the diode will only conduct when the sawtooth positive potential on the plate of the diode exceeds the adjusted positive potential on the cathode of said diode, providing an output pulse shown at 47. This output pulse is fed into the amplifying and clipper stage 35, whereby an output pulse 48 is derived, which is applied to the input of the blocking oscillator 36. This provides an output pulse 49 at the output of the blocking oscillator 36 which is delayed from the original trigger pulse 43 by a time period depending upon the adjustment of the diode delay selector 34. The delayed pulse 49 is employed to start the sweep of the oscilloscope 12 and also to initiate range markings on the screen of the oscilloscope, as will be presently described.

As will be further explained, the delay between the transmission of the radar pulse and the transmission of the interrogate pulses, plus the delay in the operation of the alarm circuit presently to be described, may be electronically compensated for by suitably adjusting the diode delay selector 34.

The negative trigger pulse 49 cuts off the sweep multivibrator 37 to provide unblanking for the oscilloscope 12, the second grid 50 of the oscilloscope being connected to the sweep multi-vibrator 37 by a suitable conductor 51, as shown. The multivibrator 37 delivers an unblanking pulse, shown at 52, which is applied to the second grid 50. The sweep multi-vibrator 37 also provides a negative output pulse 53 which is delivered to the sweep generator 38 and cuts off the sweep generator tube to allow a condenser to charge toward positive voltage through a stepping resistor, providing an output sawtooth 54. The sawtooth pulse 54 is applied to the input of the sweep voltage amplifier 39 where it is inverted and amplified, as shown at 55, and the pulse 55 is applied to the second sweep voltage amplifier 40 where it is again inverted and amplified, appearing at the output of the sweep voltage amplifier 40 as the sawtooth wave 56. The input of the sweep current amplifier 42 is clamped by a diode 41 in a conventional manner. The sweep current amplifying stage 42 provides an output wave 57 which electrically drives the deflection coils 13. Sweep linearity is maintained by the use of degenerative feed-back, as by a feedback conductor 58 connected between the sweep current amplifier 42 and the sweep voltage amplifier 40.

The delayed negative trigger pulse 49 is employed to develop range markers on the screen of the oscilloscope 12 by means of a conventional pulse forming circuit comprising a multi-vibrator 59, a range marker oscillator 60, an over-driven amplifier 61, a differentiation circuit 62, a negative clipping circuit 63, an amplifier 64 and a cathode follower 65.

The delayed negative pulse 49 triggers the multi-vibrator 59 which is of a type providing the output wave form 66, the positive portions of the wave 66 being employed to gate on the range marker oscillator 60 at every second trigger pulse 49. This allows sufficient time between the successive positive portions of the wave 66 for the oscillations of the range marker oscillator 60 to dampen out. These oscillations are delivered to the over-driven amplifier 61 wherein the oscillations are squared, as shown at 67, the square wave being preserved, while the positive portions are clipped. The negative going square pulses are differentiated in the differentiation circuit 62 and are again clipped by the negative clipper stage 63, being then passed through the inverting amplifier 64, appearing as the range mark pulses 68. The range mark pulses 68 are applied to a cathode follower 65 which delivers them to the grid 69 of the cathode ray tube 12, wherein said pulses appear on the sweep of the cathode ray tube as intensified range marks.

The circuits thus far described are entirely conventional and form no part of the present invention, except for the relays 23 and 25 and their associated circuitry.

In the system illustrated in FIGURE 1, the alarm circuit portion is designated generally at 70. The alarm circuit 70 comprises an inverter stage 71, a dual triode amplifier stage 72, and a trigger tube 73 which includes the relay 27 in its plate circuit. As will be presently explained, the trigger tube 73 is connected so as to provide a gated cathode follower output pulse 86 upon reception of an emergency signal, whereby a synthetic marker will be generated in subsequent circuitry and will appear on the sweep screen of the cathode ray tube 12 as an intensified marker at the range of the aircraft emitting the emergency signal. This circuitry comprises a marker multi-vibrator 74, a Wien bridge oscillator 75, a negative clipper and amplifying stage 76, a differentiation circuit and clipper stage 77, and a cathode follower stage 78. The video pulses from the recognition equipment, as shown at 80, are inverted in the inverter stage 71 and appear as negative pulses 81 which are applied to the input of the amplifier 72. The amplifier 72 comprises a twin triode, and the input pulses are simultaneously applied to both grids thereof. The plate of one section of the amplifier tube is connected to a delay line 83 and the plate of the other section of the amplifier 72 is coupled to one grid of the trigger tube 73, which may be of the thyratron type. The output of the delay line 83 is connected to another grid of the trigger tube. The grids of said trigger tube are both biased negative, preventing the tube from firing unless the positive pulses applied to its grids from the amplifier 72 and the delay line 83, respectively, and shown at 84 and 85, are in coincidence and are of sufficient magnitude to overcome the negative bias on said grids.

The positive pulses 84 and 85 will be in coincidence if the delay between successive recognition video pulses 80 corresponds to the delay introduced by the delay line 83.

The ionization of the trigger tube 73 energizes relay 27 and causes the respective armatures 29, 26 and 30 thereof to close. This actuates the audible alarm device above mentioned, stops the servo system by energizing the braking relay 25 and opens the input to the servo amplifier at the armatures 21 and 22.

When the trigger tube 73 ionizes, a positive gating pulse 86 is applied to the marker multi-vibrator 74. The marker multi-vibrator 74 is connected so as to normally supply a negative potential to the screen grid of the Wein bridge oscillator 75 and thus normally keep said oscillator cut off. The reception of the positive pulse 86 from the cathode of the thyratron tube 73 reverses the above-described normal action, bringing the Wien bridge oscillator 75 into conduction. Thus, the positive pulses of the oscillator 75 begins when the second emergency video pulse is received, since this second emergency pulse provides a positive pulse 84 on the grid 110 of thyratron 73 which is in coincidence with a positive pulse 85 produced on the grid 108 of said thyratron 73, said positive pulse 85 being produced by the first emergency video pulse and the action of the delay line 83. The coincidence of the pulses 84 and 85 triggers the thyratron tube 73. Furthermore, the frequency of the Wien bridge oscillator 75 is the same as the sweep frequency. The output wave of the oscillator 75, shown at 87, is clipped in the negative clipper and amplifier stage 76, appearing at the output thereof as the squared wave 88. The wave 88 passes through the differentiator and clipper stage 77, providing the output pulses 89. The output pulses 89 are applied to the grid 69 of the cathode ray tube 12 through the cathode follower 78, being shown as the marker pulses 89.

Since the gating pulse 86 from the cathode of the trigger tube 73 coincides with the second emergency pulse 80, and since the frequency of the Wien bridge oscillator 75 is the same as that of the delay trigger 49 and the sweep frequency, the synthetic markers 89 applied to the grid 69 through the cathode follower 78, will "lock in" and appear as a stationary marker against the range markers derived from the pulses 68, providing a means for observing the range of the aircraft transmitting the emergency pulses 80.

In order to provide separation between the radar video and the interrogated response when mixed for a common display, the radar transmitter is triggered first. Utilizing the system trigger for synchronization, it is necessary to delay this trigger 43 to provide a trigger 49 which will be in coincidence with the firing of the interrogator transmitter plus an added delay for decoding the response. This is accomplished in the adjustment of the diode delay selector stage 34.

Referring now to FIGURE 2, the alarm circuit 70 comprises an inverting amplifier stage 71 consisting of a triode having a cathode 91, a grid 92 and a plate 93. The recognition video pulses 80 are coupled to the grid 92 through a suitable coupling condenser 94 having a capacity of the order of 0.01 microfarad. A diode 95 is connected between grid 92 and ground through a resistor $R_3$ which is of the order of 500,000 ohms. The diode 95 is connected so as to limit the input to grid 92 to approximately eight volts in magnitude, thereby preventing the grid from drawing current or being driven positive.

An emergency signal in equipment of this type consists of a group of pulses spaced a predetermined distance apart. All of the recognition video pulses are delivered to grid 92 of triode 71 which inverts them, and delivers them from the plate 93 to the grids 96 and 97 of the twin triode amplifier tube 72 as the negative pulses 81.

As shown in FIGURE 2, the plate 93 is coupled with the grids 96 and 97 by means of a conventional resistance capacitance coupling network comprising the plate resistor 98, the coupling condenser 99 and the grid resistor 100. The cathode circuit of the twin triode amplifier tube 72 includes the biasing resistor $R_7$, which is of the order of 50,000 ohms, and which biases the grids 96 and 97 to approximately one volt negative. The negative pulses 81 are sufficiently large in magnitude to drive the tube 72 to cut off. When the first negative pulse 81 reaches the grids 96 and 97, it is amplified and inverted and a positive pulse starts down the delay line 83 connected to the plate 102 of tube 72, said positive pulse being shown at 85.

The delay line 83 comprises a network consisting of an inductance $L_1$ and respective condensers $C_8$ and $C_9$, said condensers being connected between the respective terminals of the inductance $L_1$ and a terminal 106 of a terminating resistor $R_8$. The terminating resistor $R_8$ is connected across the delay line 83. A plate resistor 107 is connected between the plate wire 105 and a suitable source of positive plate voltage, said plate resistor being of suitable resistance value, for example, of the order of 11,000 ohms. The condensers $C_8$ and $C_9$ are of the order of 0.02 microfarad in capacity, and resistance $R_8$ is of the order of 800 ohms. The delay line 83 is designed to provide a delay equal to the delay between successive emergency pulses 80. A coupling condenser $C_{10}$ couples the output of delay line 83 to one of the grids 108 of the thyratron tube 73.

Coupling condenser $C_{10}$ has a capacitance value of approximately 0.001 microfarad. Grid 108 is normally biased negative by a voltage of substantial magnitude, for example, 100 volts negative. This is applied to grid 108 through a suitable resistor $R_{12}$ of the order of 500,000 ohms.

The postitive pulse 85 is of sufficient magnitude to overcome the negative bias on the grids 108.

The remaining plate 109 of twin triode 72 is coupled in a conventional manner to the remaining grid 110 of the thyratron 73, for example, by means of a conventional resistance-capacity coupling network comprising the plate resistor $R_{10}$, of the order of 15,000 ohms, the coupling condenser $C_{11}$, of the order of 0.01 microfarad, and the grid resistor $R_{11}$ of the order of 500,000 ohms.

When tube 72 is cut off, a positive pulse also develops on the plate 109, said pulse being also of substantial magnitude, sufficient to overcome the negative bias on the grid 110 of thyratron 73. However, since both grids 108 and 110 are biased negative, unless both of the pulses from tube 72 arrive simultaneously at the grids 108 and 110, the thyratron 73 will not ionize. Thus, the positive pulse from plate 109, shown at 84, must arrive at the grid 110 at the same time that the positive pulse 85 from the delay line 83 arrives at grid 108 of tube 73, in order for tube 73 to ionize.

If the delay between the first and second recognition video pulses 80 corresponds to the delay provided by the delay line 83, tube 73 will ionize when the second recognition video pulse 80 is received by the circuit, since the positive pulse 84 produced by the second negative pulse 81 will coincide with the delayed positive pulse 85 developed by the first negative pulse 81, thus simultaneously overcoming the negative bias voltages on the grids 110 and 108 and causing the thyratron tube 73 to fire.

The ionization of tube 73 causes the relay 27 in its plate circuit to become energized and thus causes the armatures 30, 26 and 29 to close. This energizes the audible alarm circuit, opens the input circuit to the servo system at the armatures 21 and 22, as above explained, and applies the brake device 24 to the shaft of the slewing motor 14. The firing of the thyratron tube 73 also produces the positive pulse 86 at the cathode of the thyratron tube, said cathode being connected to ground through the cathode resistor $R_{13}$, whereby the tube operates as a cathode follower. The positive gating pulse 86 is delivered to the marker multivibrator 74 in the manner above described whereby to derive the marker pulse 89 and present same through the cathode follower 78 to the grid 69 of the cathode ray tube 12, providing an intensified marker indication on the screen of the tube in association with the range calibration markers 68, which gives a visual indication of the range of the aircraft originating the emergency signal.

As above mentioned, if the recognition video pulses 80 are not spaced by time periods corresponding to the time delay period of the delay line 83, the thyratron 73 will not fire and the alarm will not be given.

As above stated, when the radar pulses 43 are transmitted to the aircraft, the recognition video apparatus is not immediately triggered, but a time delay is provided before said recognition apparatus is triggered, by conventional means, in order that the response of the aircraft will not obliterate the target return, namely, the radar reflection signal. This time delay is a known quantity. A further time delay is involved, consisting of the time between two pulses of the recognition video signal, since two pulses 80 of said recognition video signal are required in order to fire the trigger tube 73. As previously stated, the diode delay selector stage 34 comprises a means for compensating for the above-mentioned known time delays. Thus, the sweep of the cathode ray tube 12 is delayed and the triggering of the circuit developing reference marker pulses 68 is similarly delayed.

The Wien bridge oscillator 75 is of the same frequency as the pulse repetition of the radar pulses 43 so that when the trigger tube 73 is fired, bringing the oscillator 75 into conduction, the positive pulses of the oscillator will be in coincidence with the second emergency pulse 80, and will provide a stationary marker on the screen of the oscilloscope 12 spaced relative to the range reference markers provided by the cathode follower 65 and being spaced therealong by a distance corresponding to the range of the aircraft transmitting the emergency signals.

The trigger tube 73 will remain ionized once it has been fired, maintaining the relay 27 energized, thereby providing a continuing alarm and maintaining the braking relay 25 and the servo input relay 23 energized until the plate-cathode circuit of the trigger tube 73 is subsequently opened by suitable switch means, not shown. Thus, the oscillator 75 is maintained in operation, and the range indication on the oscilloscope screen remains visible in superimposed relationship on the reference range markers derived from the output of the cathode follower 65.

While a specific embodiment of an emergency alarm system for use in conjunction with radar and recognition equipment has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an aircraft recognition system, a source of repetitive radar pulses adapted to trigger a recognition transmitter on a remote aircraft, a cathode ray tube, sweep means operatively associated with said cathode ray tube and formed and arranged to sweep the beam thereof over the screen thereof at the same repetitive rate as said radar pulses, said sweep means including rotary beam deflection coils operatively associated with said cathode ray tube, means drivingly connected to said beam deflection coils and being formed and arranged to normally rotate same continuously, means to modulate said beam to provide a plurality of fixed space reference range markers on said screen, a discharge tube having a plate, a cathode, and a pair of control grids, a source of current connected in circuit with said plate and cathode, means normally biasing each grid beyond cut-off, respective signal channels connected to said grids, means to apply a recognition signal simultaneously to said signal channels, delay means in one of the signal channels formed and arranged to delay the signal passing therethrough for a predetermined time period, whereby the discharge tube remains non-conducting unless the recognition signal comprises pulses spaced by the same time period, means to further modulate said beam to provide a range mark on said screen superimposed on said fixed reference markers, and means to halt rotation of said beam deflection coils responsive to the conduction of said discharge tube.

2. In an aircraft recognition system, a source of repetitive radar pulses adapted to trigger a recognition transmitter on a remote aircraft, a cathode ray tube, sweep means operatively associated with said cathode ray tube and formed and arranged to sweep the beam thereof over the screen thereof at the same repetitive rate as said radar pulses, said sweep means including rotary beam deflection coils operatively associated with said cathode ray tube, a servo system drivingly connected to said beam deflection coils and being formed and arranged to normally rotate same continuously, means to modulate said beam to provide a plurality of fixed spaced reference range markers on said screen, a discharge tube having a plate, a cathode, and a pair of control grids, a source of current connected in circuit with said plate and cathode, means normally biasing each grid beyond cut-off, respective signal channels connected to said grids, means to apply a recognition signal simultaneously to said signal channels, delay means in one of the signal channels formed and arranged to delay the signal passing therethrough for a predetermined time period, whereby the discharge tube remains non-conducting unless the recognition signal comprises pulses spaced by the same time period, means to further modulate said beam to provide a range mark on said screen superimposed on said fixed reference markers, and means to deenergize said servo system responsive to the conduction of said discharge tube.

3. In an aircraft recognition system, a source of repetitive radar pulses adapted to trigger a recognition transmitter on a remote aircraft, a cathode ray tube, sweep means operatively associated with said cathode ray tube and formed and arranged to sweep the beam thereof over the screen thereof at the same repetitive rate as said radar pulses, said sweep means including rotary beam deflection coils operatively associated with said cathode ray tube, a servo system drivingly connected to said beam deflection coils and being formed and arranged to normally rotate same continuously, means to modulate said beam to provide a plurality of fixed spaced reference range markers on said screen, a discharge tube having a plate, a cathode, and a pair of control grids, a source of current connected in circuit with said plate and cathode, means normally biasing each grid beyond cut-off, respective signal channels connected to said grids, means to apply a recognition signal simultaneously to said signal channels, delay means in one of the signal channels formed and arranged to delay the signal passing therethrough for a predetermined time period, whereby the discharge tube remains non-conducting unless the recognition signal comprises pulses spaced by the same time period, an alarm device, means to further modulate said beam to provide a range mark on said screen superimposed on said fixed reference markers responsive to conduction of said discharge tube, means to energize said alarm device responsive to conduction of said discharge tube, means to deenergize said servo system responsive to conduction of said discharge tube, and means to halt rotation of said beam deflection coils responsive to the conduction of said discharge tube.

References Cited by the Examiner

UNITED STATES PATENTS

| | | | |
|---|---|---|---|
| 2,412,974 | 12/1946 | Deloraine | 250—20.5 |
| 2,527,769 | 10/1950 | Sinsheimer | 343—5 |
| 2,534,746 | 12/1950 | Wells | 340—167 |
| 2,648,060 | 8/1953 | Turner | 343—6.5 |
| 2,679,617 | 5/1954 | Mullaney | 250—2 |
| 2,706,810 | 4/1955 | Jacobsen | 343—6.8 |

CHESTER L. JUSTUS, *Primary Examiner.*

NORMAN H. EVANS, FREDERICK M. STRADER, KATHLEEN H. CLAFFY, *Examiners.*

M. A. MORRISON, G. J. MOSSINGHOFF, D. MEXIC, D. C. KAUFMAN, *Assistant Examiners.*